March 1, 1960
T. V. MILLER ET AL
2,926,453
BAIT HOLDING FISH HOOK ASSEMBLY
Filed Nov. 25, 1957
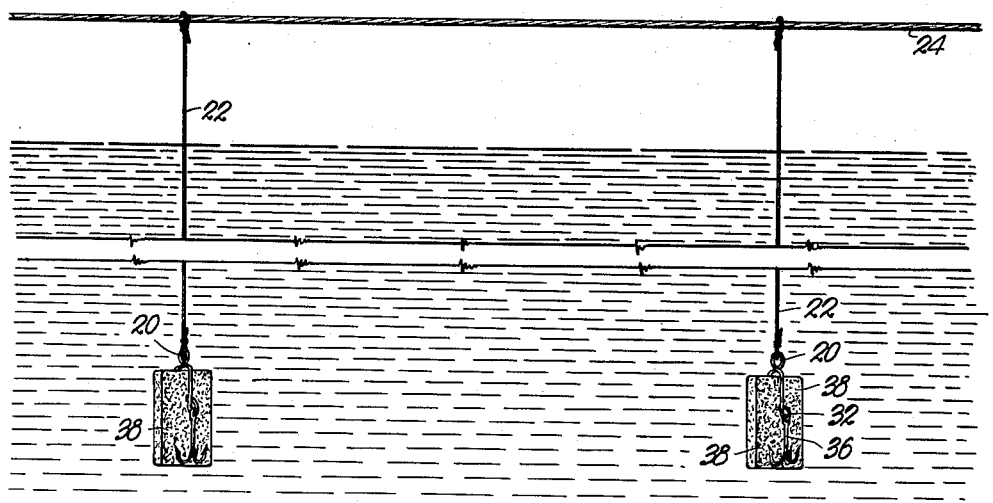
Fig. 1.
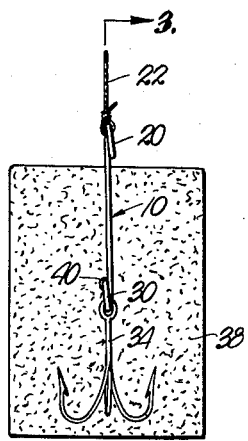
Fig. 2.
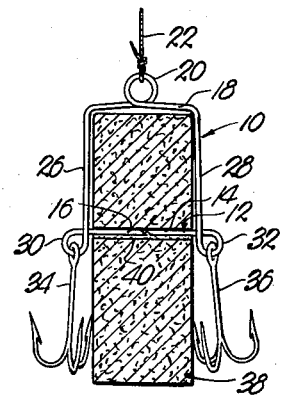
Fig. 3.
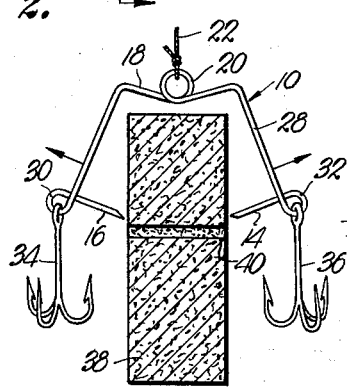
Fig. 4.
INVENTORS.
Thomas V. Miller
Clarence E. Peters
BY
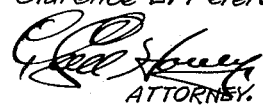
ATTORNEY.

United States Patent Office 2,926,453
Patented Mar. 1, 1960

2,926,453
BAIT HOLDING FISH HOOK ASSEMBLY

Thomas V. Miller, Hickman Mills, and Clarence E. Peters, Kansas City, Mo.

Application November 25, 1957, Serial No. 698,423

1 Claim. (Cl. 43—44.6)

This invention relates to a bait holding fish hook assembly and more particularly to such an assembly that may be quickly manipulated to receive and support the bait in proper and desirable position relative to the hooks.

The primary object of this invention is to provide a bait holding fish hook assembly which is easily operable and which has its parts disposed in such a manner that a bait may be positioned on uniquely formed spurs constituting a part of a frame without likelihood of the operator being snagged by the hooks carried by the assembly.

Another object of the instant invention is to provide a device capable of securely holding the selected bait in place between the hooks of the assembly and in such a manner that the bait will not fall from the assembly or be dislodged by the fish nibbling thereon.

A yet further object of the invention is to provide a bait holding fish hook assembly which maintains the hooks in such relation to the bait that a fish approaching and attempting to nibble the bait will be snagged by the hooks.

Still another object of the invention is to provide a device of the character described which is simple and economical to manufacture and that may be formed from a single length of resilient wire.

Other objects will appear during the course of the following specification, reference therein being had to the accompanying drawing, wherein:

Fig. 1 is a perspective view of a pair of bait holding fish hook assemblies made pursuant to the instant invention, the same being shown in normal operative position suspended from a trotline.

Fig. 2 is an enlarged side elevational view of one of the assemblies;

Fig. 3 is a cross-sectional view taken along lines 3—3 of Fig. 2 looking in the direction of the arrows.

Fig. 4 is a similar cross-sectional view showing the frame of the assembly spring from the bait for placement or removal thereof.

The preferred form of the bait holding fish hook assembly embodying the invention has a body broadly designated by the numeral 10. This body is formed from a single length of resilient material, preferably wire and is in the nature of a substantially square, open polygonal frame.

The frame 10 has its normally lowermost side 12 divided at the center thereof to form a pair of spurs 14 and 16 of substantially equal length. The opposite side of the frame 18, is the normally upwardly disposed side, and has a coiled portion 20 formed thereon. This coiled portion 20 is adapted to receive a line 22 for suspending the entire assembly from a trotline 24 in the manner shown in Fig. 1. The coiled portion 20, cooperates with the resiliency of the material from which the frame 10 is created in maintaining the frame in a closed position and the spurs 14 and 16 in longitudinal alignment with their free ends in close proximity when the assembly is in the normal closed, position as shown best in Fig. 3.

The other sides 26 and 28 of the frame 10 are each provided with a loop 30 and 32 respectively for receiving fish hooks 34 and 36. These loops 30 and 32 may be placed at any position along sides 26 and 28 respectively but, as shown in the drawing, are preferably formed outwardly from the frame and at the zone of juncture between the lower side 12 and sides 26 and 28 respectively. With the loops 30 and 32 so formed and disposed in this position, fish hooks 34 and 36 may conveniently be of a length substantially the same as that portion of a block of bait 38 disposed below side 12 when the bait is engaged by the assembly. Such a structure, coupled with the use of three pronged fish hooks, enables a major portion of the broadest lower surface of bait 38 to be swept by fish hooks 34 and 36 when the assembly is in use and as best shown in Fig. 2.

The bait 38 used in association with the bait holding fish hook assembly 10 may be of any nature, either live or processed, so long as it is capable of fitting within the opening created by spurs 14 and 16 when they are spread apart as shown in Fig. 4. However, as noted from the drawing, it is preferred to use a block of processed fish bait 38, provided with a bore 40 at substantially the center thereof. Bore 40 easily receives spurs 14 and 16 when the assembly 10 returns to a closed position shown in Fig. 3 from that illustrated in Fig. 4. Coiled portion 20 functions as a pivotal zone for all remaining parts of the frame 10. Manifestly, in the absence of a bore such as 40, the aforementioned spring action will force spurs 14 and 16 into the opposite sides of any suitable material selected as bait, and will retain said spurs in place. Spurs 14 and 16 have their ends sharpened to easily pierce the bait if no bore is provided.

As is apparent from the drawings and the foregoing description, in order to place or remove the bait 38, the manipulator merely grasps sides 26 and 28 respectively and pulls outwardly to separate the spurs 14 and 16. When separated from their position within bore 40, spurs 14 and 16 disengage the bait 38 and the same drops free from the assembly.

It is realized that bait holding fish hook assemblies having physical characteristics different from those illustrated and described may be made without departing from the spirit of the invention or scope of the appended claim.

Having thus described the invention what is claimed as new and desired to be secured by Letters Patent is:

A bait holding fish hook assembly formed from a single length of resilient wire, said assembly comprising a substantially square frame, one normally lowermost side thereof being divided to form a pair of opposed, inwardly directed spurs of equal length normally in longitudinal alignment with the free ends thereof in close proximity; a coiled portion formed on the opposite side of the frame midway between the ends thereof, said spurs being in a horizontal plane parallel to the plane of said opposite side; a loop on each of the other two sides of the frame respectively, said loops being at the points of juncture of said other two sides with said one side respectively, said other two sides lying in parallel planes; a fish hook supported by each loop; and a block of bait disposed partially within the frame with the spurs projecting thereinto to hold the same in place, that portion of the block of bait confined within the frame having a cross sectional area substantially the same as the space defined by the frame, that portion of the block of bait without the frame being of substantially equal cross sectional area to that within the frame and being disposed between said fish hooks.

References Cited in the file of this patent

FOREIGN PATENTS

| | | |
|---|---|---|
| 51,227 | Sweden | Mar. 15, 1922 |
| 802,205 | France | June 6, 1936 |
| 906,476 | France | May 14, 1945 |